United States Patent [19]
Matsubara et al.

[11] Patent Number: 6,101,284
[45] Date of Patent: *Aug. 8, 2000

[54] METHODS AND SYSTEMS FOR OPTIMIZING IMAGE DATA COMPRESSION INVOLVING WAVELET TRANSFORM

[75] Inventors: Akio Matsubara, Yokohama; Hayashi Taniguchi; Noboru Murayama, both of Tokyo, all of Japan

[73] Assignee: Ricoh Company, Ltd., Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/742,589

[22] Filed: Oct. 28, 1996

[30] Foreign Application Priority Data

Nov. 2, 1995 [JP] Japan ..................... 7-286304

[51] Int. Cl.⁷ ..................... G06K 9/40
[52] U.S. Cl. ............ 382/260; 382/232; 382/248; 358/426; 358/432; 348/398; 348/403
[58] Field of Search ................ 382/260, 263, 382/264, 232, 235, 248; 358/426, 432, 433; 348/398, 403

[56] References Cited

U.S. PATENT DOCUMENTS

| 5,014,134 | 5/1991 | Lawton et al. | 358/432 |
| 5,274,719 | 12/1993 | Taniguchi et al. | 382/56 |
| 5,546,477 | 8/1996 | Knowles et al. | 382/264 |

OTHER PUBLICATIONS

Article entitled "Subband Encoding and Wavelet Transform" (in Japanese), Interface, pp. 147–169 (Aug. 1992).

Article entitled "Wavelet Transforms", by Glassner, Principles of Digital Image Synthesis, vol. One, Chapter 6, pp. 243–298 (1995).

*Primary Examiner*—Thomas D. Lee
*Attorney, Agent, or Firm*—Knoble & Yoshida LLC

[57] ABSTRACT

The improved image compression method and system optimizes a wavelet transform compression technique by further compressing the transformed data by an edge operation before encoding by a conventional technique.

30 Claims, 8 Drawing Sheets

| WITHOUT EDGE CONVERSION | | | WITH EDGE CONVERSION | | |
|---|---|---|---|---|---|
| 7 | 8 | hd=4 | 7 | 8 | hd=1 |
| 0 | 1 | 1 | 0 | 1 | 1 |
| 1 | 0 | 1 | 1 | 1 | 0 |
| 1 | 0 | 1 | 0 | 0 | 0 |
| 1 | 0 | 1 | 0 | 0 | 0 |

FIG. 8

| EXAMPLE ORIGINAL IMAGE NAME | SIZE [byte] | ONLY WAVELET [byte] | bite/pixel | WAVELET + EDGE [byte] | bite/pixel |
|---|---|---|---|---|---|
| HOTEL | 829440 | 845969 | 8.16 | 470999 | 4.54 |
| GOLD | 829440 | 801660 | 7.73 | 466631 | 4.50 |
| BIKE | 209971520 | 214477789 | 8.18 | 107774929 | 4.11 |
| WOMAN | 209971520 | 222839406 | 8.71 | 119126621 | 4.54 |
| CAFE | 209971520 | 246252322 | 9.39 | 142671261 | 5.44 |
| TOOLS | 7315200 | 8841562 | 9.66 | 5413291 | 5.92 |
| BIKE3 | 2153217 | 2586582 | 9.61 | 1473920 | 5.47 |
| WATER | 18874368 | 8619856 | 3.65 | 4502165 | 1.90 |
| CATS | 18874368 | 9809166 | 4.15 | 6472563 | 2.74 |

FIG. 9

METHODS AND SYSTEMS FOR OPTIMIZING IMAGE DATA COMPRESSION INVOLVING WAVELET TRANSFORM

FIELD OF THE INVENTION

The current invention is generally related to a method and a system for optimizing image data compression involving wavelet transform, and more particularly related to the method and the system for optimizing a wavelet transform compression technique by further compressing the transformed data by an edge operation before encoding by a conventional technique.

BACKGROUND OF THE INVENTION

The compression rate of image data has increasingly become an important issue as computer graphics is widely used. To compress image data, subband encoding techniques are generally accepted and include Discrete Cosine Transform (DCT) and Wavelet Transform. In general, the subband image coding techniques rely upon the representation that image display signals for representing lower frequency regions of an image have stronger electrical power that those representing higher frequency regions. Since the lower frequency regions contain more visual information, the larger number of bits is assigned to represent the lower frequency regions. These encoding techniques are generally applied to a predetermined number of image-blocks, and to compress the image data information, a portion of each block is assigned a predetermined number of bits based upon the frequency in the portion. To determine the frequency in the portion, a frequency filter of a predetermined characteristics is used. In general, please see for example, Wavelet Transforms, Chapter 6, Principles of Digital Image Synthesis, Vol One, Glassner (1995).

Among the above described encoding techniques, the wavelet transform appears to be desirable for compressing image data. To be desirable in compressing digital data, a basis expression of filters should be discrete and orthogonal. One example of such filters includes the Haar basis. Using these filters, the wavelet transform provides multi resolution expressions and a zonally variable basis. In other words, as the wavelet transform is recursively repeated, the resolution is reduced by half. In addition, the band dividing characteristic of the filters used in the wavelet transform allows octave divisions. In contrast to these advantages, DCT does not provide the above described advantageous filter characteristics. "Subband encoding and Wavelet Transform," in Japanese, Interface, August (1992).

Despite the above described advantages of the wavelet transform-based compression technique, due to the increased use of computer graphics, the compression rate is desired for improvement especially for large image data.

SUMMARY OF THE INVENTION

To solve the above and other problems, according to the current invention, a method of optimizing an image data compression technique, image data representing an image comprising a plurality of pixels, each pixel indicating visual information, includes the following steps of: a) selecting two of the pixels which are adjacently located with each other in one of predetermined directions; b) determining a high frequency coefficient and a low frequency coefficient based upon the visual information of the selected two adjacent pixels; c) placing the high frequency coefficient at a first location while the low frequency coefficient at a second location with respect to original pixel locations; d) repeating the steps a) through c) until all of the predetermined directions are completed; e) converting a plurality of the high frequency coefficients and the low frequency coefficients according to a predetermined edge conversion technique; and f) encoding the edge converted coefficients according to a predetermined compression technique.

According to a second aspect of the current invention, a system for optimizing an image data compression technique, image data representing an image comprising a plurality of pixels, each pixel indicating visual information, includes: a wavelet converter having a memory for selecting two of the pixels which are adjacently located with each other in one of predetermined directions in the memory and determining a high frequency coefficient and a low frequency coefficient based upon the visual information of each of the selected two adjacent pixels, the high frequency coefficient and the low frequency coefficients being respectively placed at a first location and a second location in the memory with respect to original pixel locations; an edge convertor connected to the wavelet convertor for converting the high frequency coefficients and the low frequency coefficients according to a predetermined edge conversion technique; and an encoder connected to the edge convertor for encoding the edge converted coefficients according to a predetermined compression technique.

These and various other advantages and features of novelty which characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

DETAILED DESCRIPTION OF THE PREFERRED EMBODIMENT(S)

Figure 1:
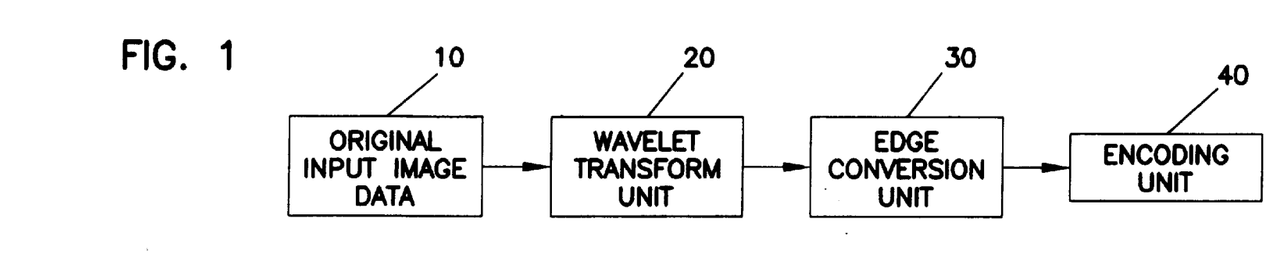
FIG. 1 diagrammatically illustrates a compression system according to the current invention.

Referring now to the drawings, wherein like reference numerals designate corresponding structure throughout the views, and referring in particular to FIG. 1, one preferred embodiment of the image compression system according to the current invention is diagrammatically illustrated. In general, the preferred embodiment compresses original input image data 10 which represents an original image to save storage space or transmission capacity. The image data is inputted into a wavelet transform unit 20 for transforming the image data into coefficients based upon predetermined filters. An edge conversion unit 30 then converts the coefficients based upon a predetermined conversion technique. Lastly, the edge processed coefficients are encoded based upon a predetermined encoding technique.

Figure 2:
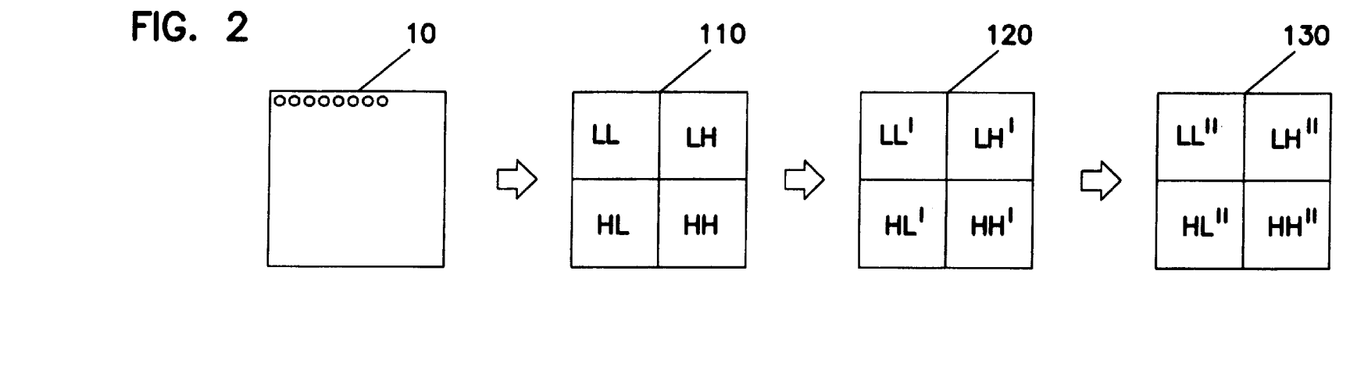
FIG. 2 diagrammatically illustrates how the original image data is processed by a wavelet transform technique.

Referring to FIG. 2, the image data is diagrammatically illustrated at various stages in the above described processing elements. Generally speaking, an original picture is represented by image data 10, which includes pixel data. The image data 10 is first undergoes the wavelet transform process and is transformed into coefficients 110 which are grouped into four categories LL, LH, HL and HH. Each of the coefficients then undergoes the edge conversion process and is converted into the edge converted coefficients 120 which are still in the four categories LL', LH', HL' and HH'. Lastly, the edge converted coefficients are encoded into the compressed data 130, which are indicated by the four groups LL", LH", HL" and HH". To further describe each state of the image data, the additional descriptions of processing components are also described below.

Figure 3:
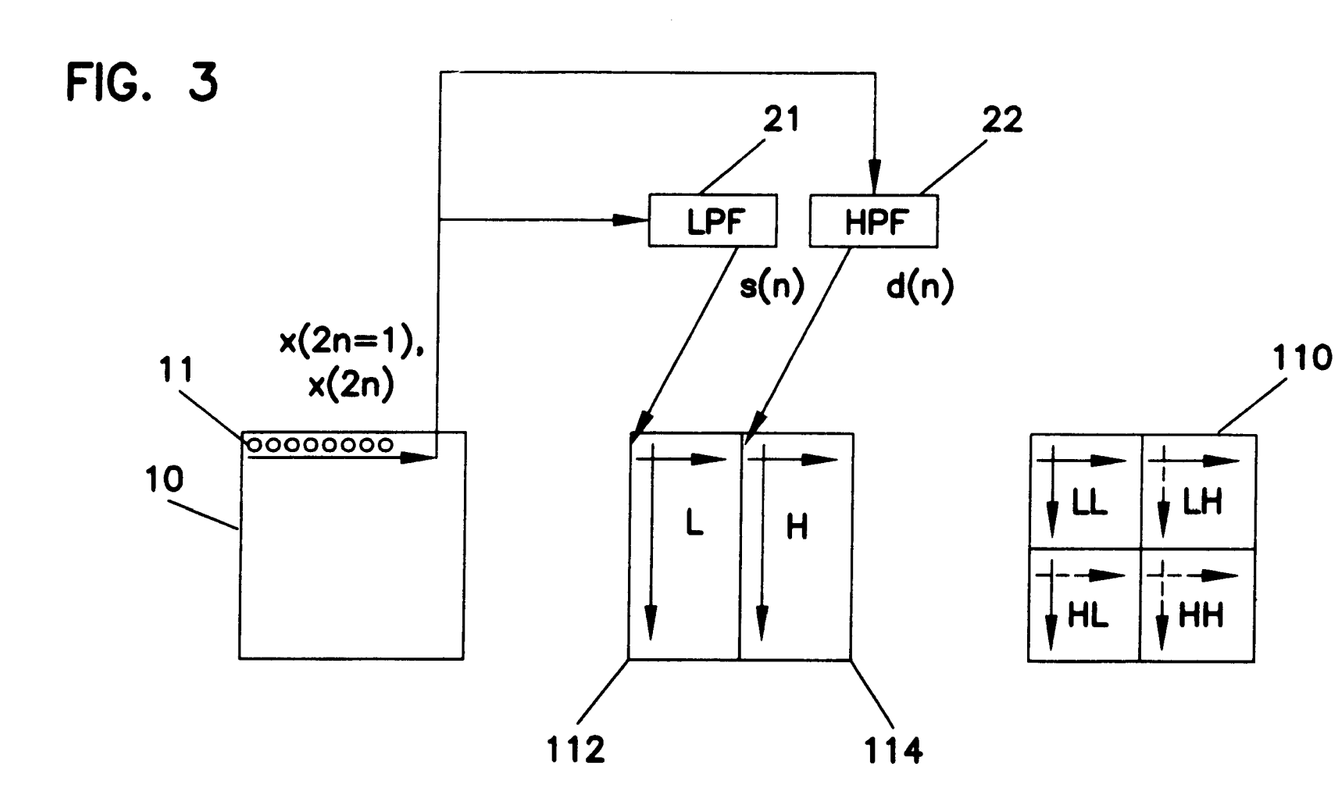
FIG. 3 illustrates some detail processes of the wavelet transform technique.

Referring to FIG. 3, the image data 10 includes a plurality of pixel data 11. For example, each pixel is represented by 8-bit information or 256 of shades. In using a Red, Green and Blue (RGB) model, one pixel is represented by three 8-bit color elements or 24-bit information. In case of a Cyan, Magenta, Yellow and Black (CMYK) model, one pixel is represented by four 8-bit color elements or 32-bit information. The original image data 10 is ultimately transformed into coefficients 110.

Still referring to FIG. 3, to transform the above described image data, a high frequency filter 22 and a low frequency filter 21 are applied to two adjacent pixel data x(2n) and x(2n+1). The high frequency filter 22 is defined by a function d(n) while the low frequency filter 21 is defined by s(n) where a variable n is a non-negative integer. One example of the functions s(n) and d(n) is defined by the following equations:

$$s(n) = \max\_int((x(2n)+x(2n+1))/2)$$

$$d(n) = x(2n) - x(2n+1)$$

where n is a non-negative integer, x(n) returns visual information or pixel value of one of the pixels specified by n and max_int(n) returns a maximum integer not exceeding n. However, other examples of the filters do not include the max_int function, and the number of taps is not limited to 2 as shown in the above examples.

The high frequency filter 22 generates a first coefficient while the low frequency filter 21 generates a second coefficient based upon the two adjacent pixel data. The first coefficient is placed at a relative location corresponding to the adjacent pixels in the right half H or 112 of the original image. Similarly, the second coefficient is placed at a relative location corresponding to the adjacent pixels in the left half L or 114 of the original image as shown in 11. The above described process is repeated for pairs of adjacent pixels in a horizontal direction for each line as indicated by an arrow in the original image data 10. As the process is repeated, the coefficients are placed at the corresponding relative locations in each of the areas 112 and 114 as respectively indicated by a horizontal solid-line arrows and dotted-line arrows.

Still referring to FIG. 3, the above described filtering process is repeated on the coefficients in a vertical directions. In other words, a pair of the coefficients are now selected in a vertical direction in each of the areas 112 and 114, and the above described filters are applied. For the pair of coefficients selected from the area 112, the high frequency filter generates a HL coefficient while the low frequency filter generates a LL coefficient. The HL coefficient is placed at a relative location corresponding to the adjacent coefficients in the lower left quadrant in the coefficient data 110. Similarly, the LL coefficient is placed at a relative location corresponding to the adjacent pixels in the upper left quadrant in the coefficient data 110. By the same token, for the pair of coefficients selected in a vertical direction from the area 114, the high frequency filter generates a HH coefficient while the low frequency filter generates a LH coefficient. The HH coefficient is placed at a relative location corresponding to the adjacent coefficients in the lower right quadrant in the coefficient data 110. Similarly, the LH coefficient is placed at a relative location corresponding to the adjacent coefficients in the upper left quadrant LL in the coefficient data 110. In each quadrant, a dotted line indicates high frequency coefficients while a solid line indicates low frequency coefficients.

In summary, the quadrangle LL contains the wavelet transform coefficients that are generated by a low pass filter in both the horizontal and vertical directions. The quadrangle LH contains the wavelet transform coefficients that are generated by a high pass filter in the horizontal direction and by a low pass filter in the vertical direction. In contrast, the quadrangle HL contains the wavelet transform coefficients that are generated by a low pass filter in the horizontal direction and by a high pass filter in the vertical direction. Lastly, the quadrangle HH contains the wavelet transform coefficients that are generated by a high pass filter in both the horizontal and vertical directions.

Figure 4:
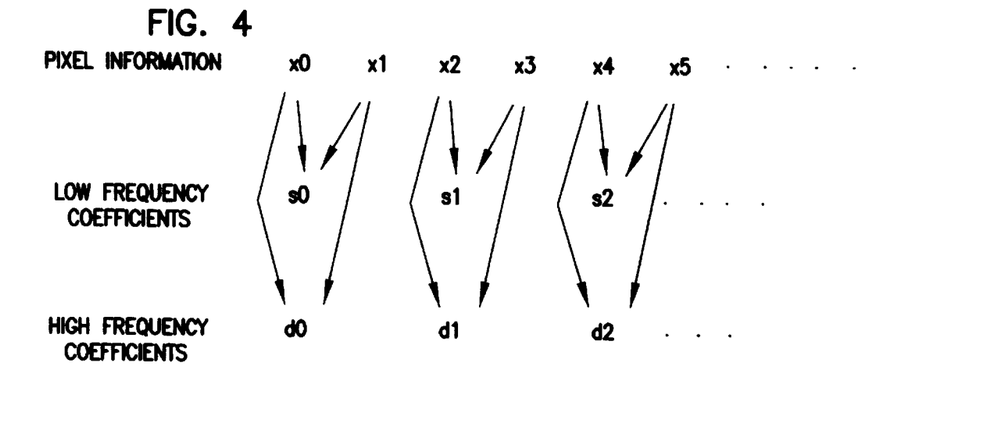
FIG. 4 is a diagrammatic representation of a relation between the original pixel information and the wavelet coefficients.

Referring to FIG. 4, the above described wavelet transform is diagrammatically illustrated to describe the relationship between the pixel information and the wavelet transform coefficients. The pixel information is denoted by $x_0$ through $x_{2n}$, and the two adjacent pixel information is indicated by two consecutive subscript numbers. For example, two adjacent pixel information $x_0$ and $x_1$ are used to generate the corresponding low frequency coefficient $s_0$. Similarly, the next two adjacent pair of pixel information $x_2$ and $x_3$ generate the corresponding high and low frequency coefficients $s_1$ and $d_1$.

Figure 5:
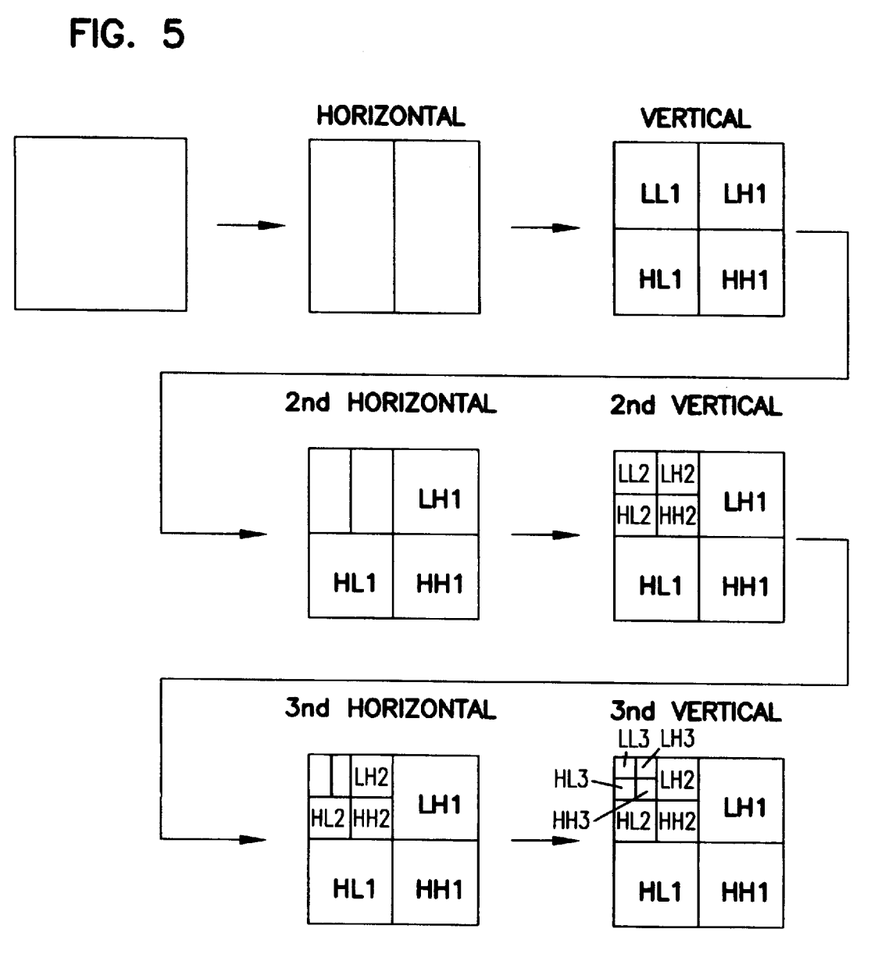
FIG. 5 diagrammatically illustrates the recursively processed wavelet coefficients.

Referring to FIG. 5, the above described horizontal and vertical scanning of the pixel information is recursively repeated for a predetermined number of times. After a first time of the horizontal and vertical wavelet transformation, the first set of coefficients in quadrangles LL1, LH1, HL1 and HH1 is generated. Using these coefficients, another round of the wavelet transformation is performed on the LL1 quadrant. As shown in the second row, after the second wavelet transform in the horizontal direction, the upper left quadrant LL1 is grouped into two vertical halves. Following the second horizontal and vertical processing, the LL1 quadrant is now grouped into four sub-quadrants LL2, LH2, HL2 and HH2 each containing wavelet coefficients. In the third row, the coefficients in the upper left sub-quadrant LL2 is further recursively transformed into tertiary coefficients in sub-sub quadrant LL3, LH3, HL3 and HH3.

Figure 6:
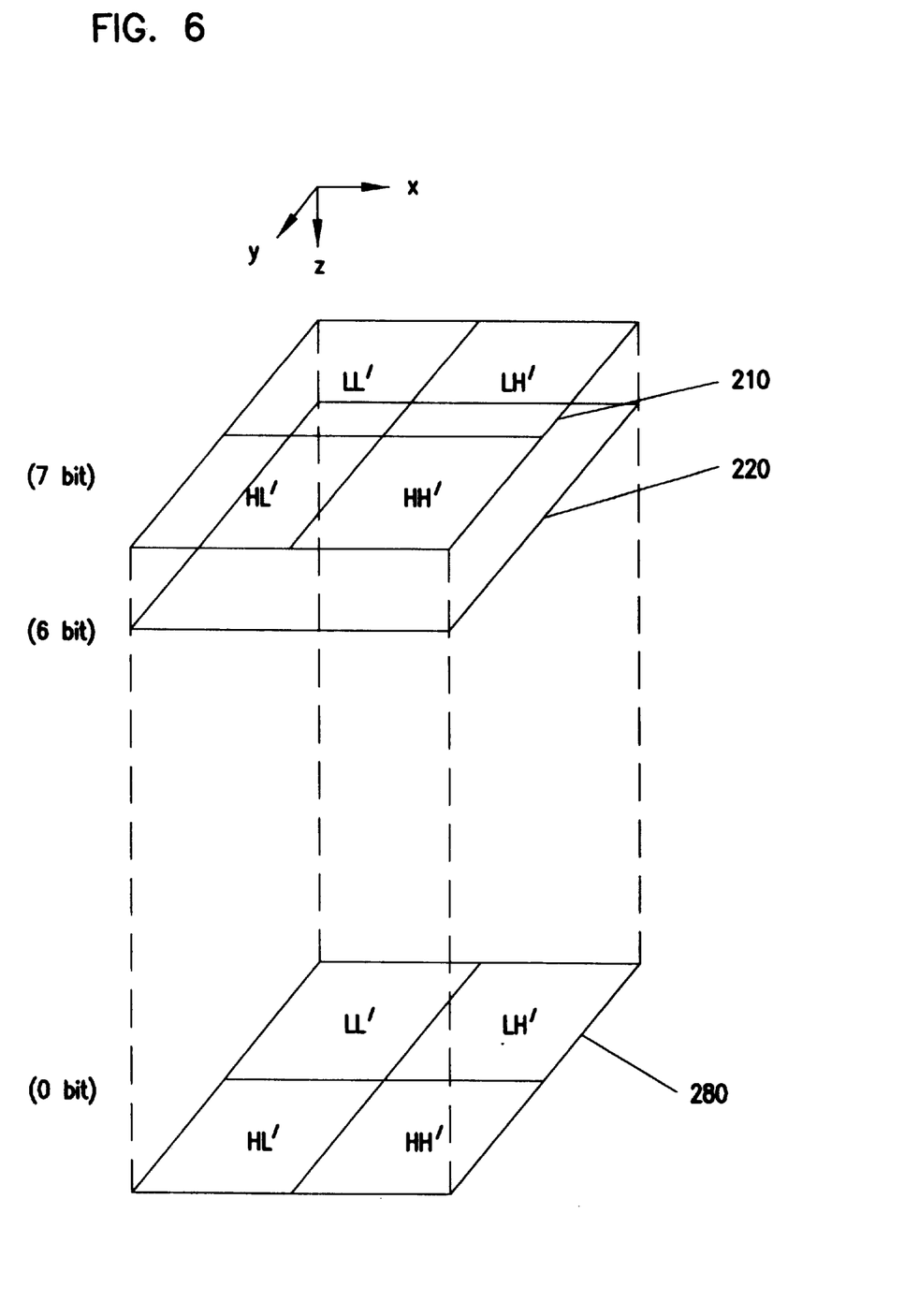
FIG. 6 diagrammatically illustrates the application of the wavelet transform to the bit plane data.

Referring to FIG. 6, the above described wavelet transformation is applicable for color image data. For example, if each color component is represented by 8 bits to express 256 color values, there are eight bit planes 280 through 210.

Each of these bit planes is successively transformed by the above described wavelet processing.

Referring back to FIG. 1, after the wavelet transformation is complete, an edge conversion unit 30 processes the wavelet transformation coefficients. In general, the edge conversion process is to perform an exclusive OR operation on a current bit and its adjacent more significant bit and to replace the current bit with the result. For example, if the bit pattern of the wavelet coefficients is "11110000," the result of the exclusive OR operation is "10001000" where 0 is assumed at the left most bit. The detail of the edge conversion is incorporated hereby external reference from U.S. Pat. No. 5,274,719. In essence, the above described edge conversion indicates the difference in location between binary values. The application of the edge conversion technique to the wavelet transformation coefficients is uniquely advantageous in efficiently compressing the image data since the wavelet coefficients tend to be close binary numbers that are adjacently located.

Figure 7:
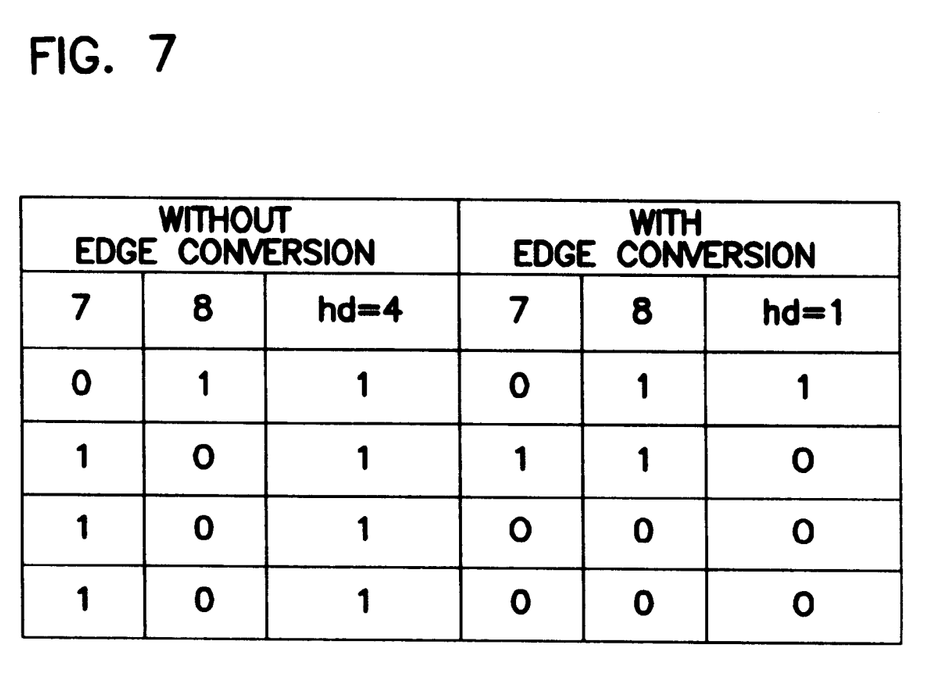
FIG. 7 is a table showing a desirable compressing effect of the edge conversion on the coefficients.

Referring to FIG. 7, two binary number values seven and eight are used to demonstrate the above described advantage of applying the edge conversion. Assuming that the wavelet coefficient values are 7 and 8, in the table as shown in FIG. 7, the binary representation of these coefficients are vertically placed in such a way that the most significant bit is at the top. In the left half of the table, each of these coefficients is not converted by the edge conversion, and the Hamming distance between these coefficients totals 4. In contrast, in the right half of the table, the same coefficients are each edge converted. The Hamming distance between these edge converted coefficients is reduced to one. The smaller Hamming distance generally is desirable for further encoding or compression of the image data. The direction of the edge conversion includes the X direction for converting horizontally located coefficients, the Y direction for converting vertically located coefficients and the Z direction for converting the coefficients perpendicularly located to the XY direction. According to one preferred process of the current invention, for color image data, the coefficients in all of the quadrants are initially edge converted in the Z direction, and then the coefficients in the LH quadrant is edge converted in the Y direction while the coefficients in the HL quadrant is edge converted in the X direction. For black and white image data, there is no need to perform the edge conversion in the Z direction.

Figure 8:
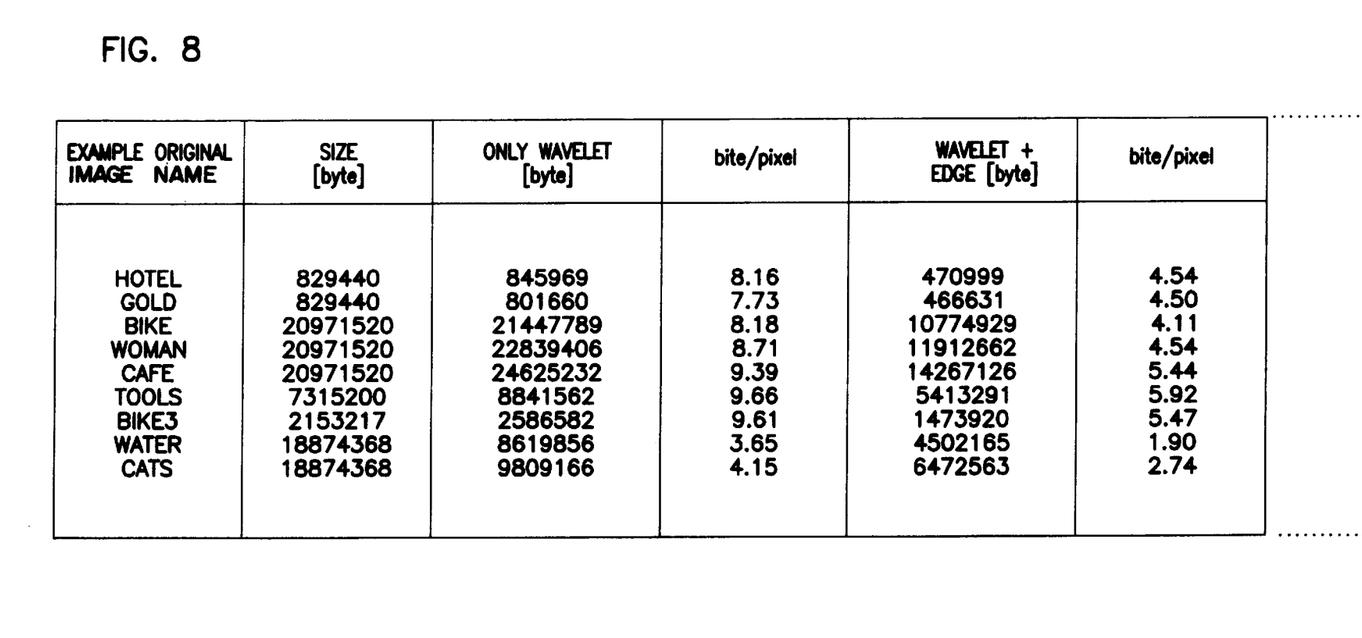
FIG. 8 is a table showing examples of the desirable compressing rates of the current invention.

To complete the compression of the image data, according to one preferred method of the current invention, the above converted coefficients undergo a conventional encoding process. According to one preferred process, the coefficients in the LL quadrant are not encoded. The conventional encoding techniques include the Huffman encoding technique, an arithmetic encoding technique and other known techniques. Referring to FIG. 8, a table contains the data for comparing the effects of the wavelet transform, the edge conversion on the compression rate. Nine original images are generally described by one word in the left column, and the corresponding image size is provided in the number of bytes in the second column. The third column indicates the size of each compressed image data after the wavelet transform and a conventional encoding according to prior art while the fourth column provides the corresponding number of bits per pixel. The fifth column from the left is the size of each image data after the encoding of the edge converted wavelet coefficients according to the current invention. The sixth column is the corresponding number of bits per pixel. As compared by the number of bytes, the original image data is not always compressed by the wavelet transform. While some image data such as "water" is reduced by less than 50%, the size of other image data increased with the wavelet transform. However, when the wavelet transform coefficients are converted by the edge conversion technique as well as by a conventional encoding technique, the amount of the image data is further compressed by over 50%.

Figure 9:
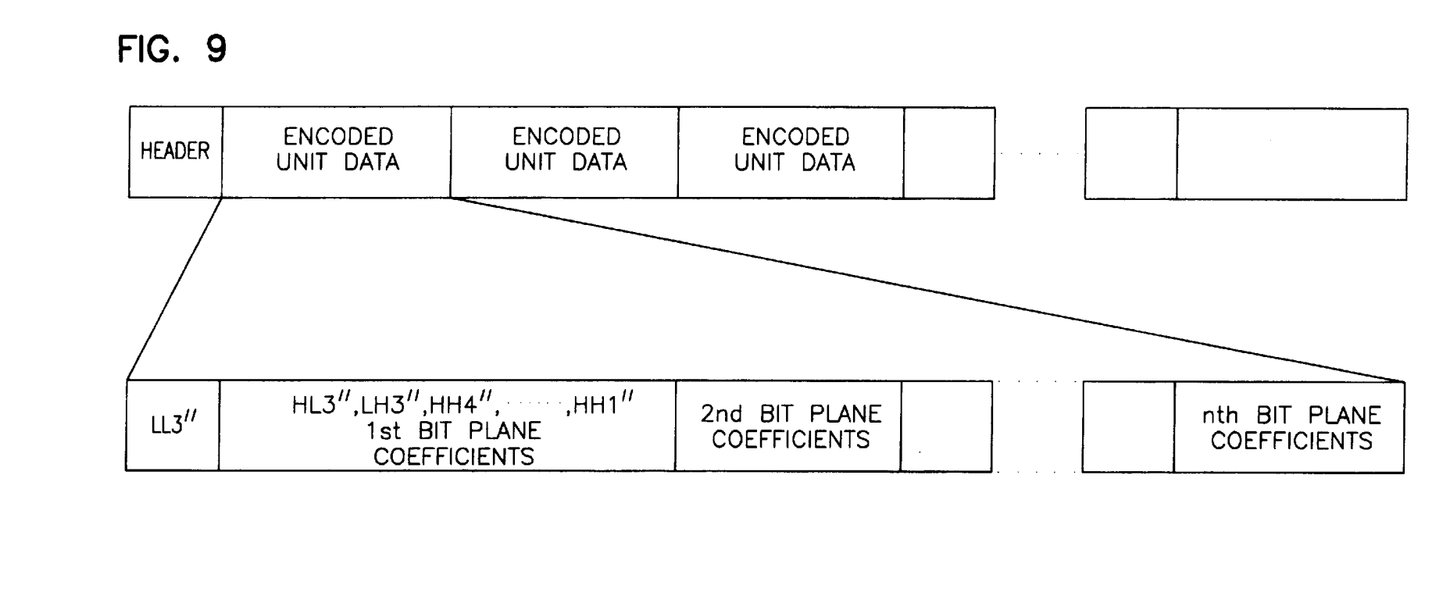
FIG. 9 is one example of the data format for the compressed data according to the current invention.

Now referring to FIG. 9, one preferred data format of the above described compressed data is diagrammatically illustrated. In general, the compressed data includes a header followed by a plurality of the encoded unit data. In each set of the encoded unit data, a predetermined number of bit planes such as eight planes is organized, and each bit plane has a predetermined number of sets for recursively transformed data such primary through tertiary data. Lastly, each transformed set data has quadrant data in a predetermined order such as LL, LH, HL and HH. According to one preferred method, the coefficients in the LL quadrant is not encoded. The current invention is not limited to the above described data and is practiced without conforming to the above described preferred data format.

Figure 10:
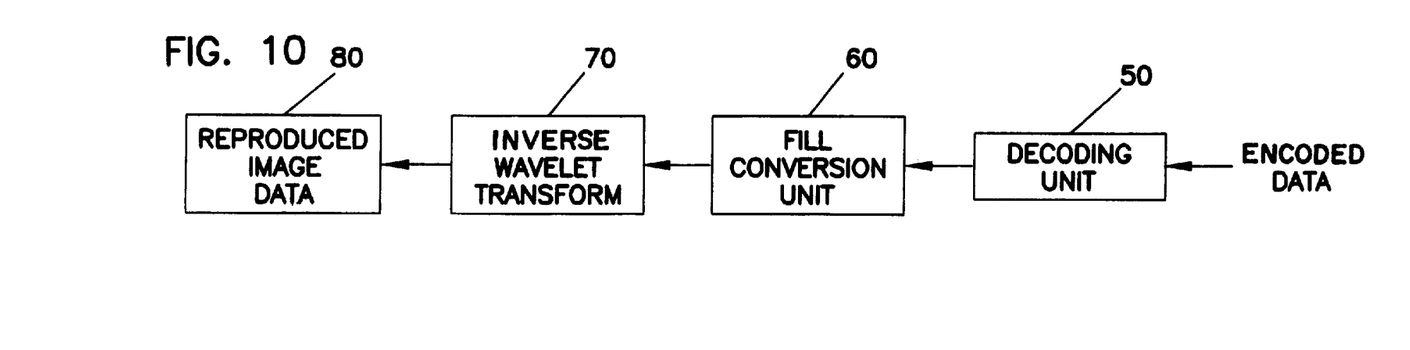
FIG. 10 diagrammatically illustrates a decompression system according to the current invention.

Referring to FIG. 10, the above described compressed data according to the current invention is decompressed to reproduce the original image. One preferred embodiment of a decompression unit according to the current invention includes a decoding unit 50 for decoding the above described encoded coefficient data. A fill conversion unit 60 then performs an inverse of the edge conversion on the decoded coefficient data. In general, the fill conversion unit reverses the edge operation by performing exclusive OR between previous results of exclusive OR and the current bits from left to right. For example, "10001000" is filled according to the fill operation to generate "11110000," where the 0 is assumed at the left most bit. The detail of the fill conversion is incorporated hereby external reference from U.S. Pat. No. 5,274,719. An inverse wavelet transforming unit 70 performs the last step to reproduce the original image 80 from the above decoded and fill processed coefficients. In general, the inverse wavelet transformation unit 70 includes two circuit elements which are inversely related to the above described s(n) and d(n) filters as follows:

$$x(2n)=s(n)+\max\_int((d(n)-1)/2)$$

$$x(2n+1)=s(n)-\max\_int(d(n)/2)$$

Thus, the original pixel information is restored from the compressed data.

Figure 11:
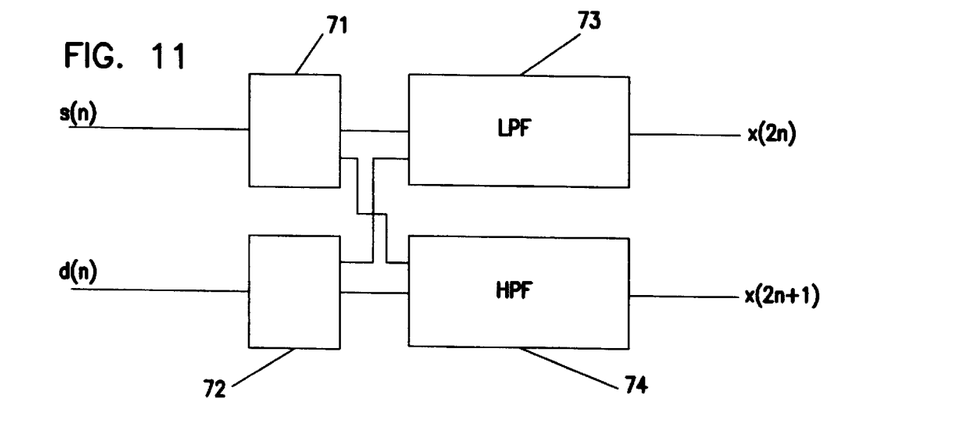
FIG. 11 is a circuit diagram of the inverse wavelet transform unit.

Now referring to FIG. 11, the above described circuit elements are illustrated. The coefficient data are represented by the functions s(n) and d(n). A first coefficient s(n) is fed to both the LPF 73 and the HPF 74. Similarly, a second coefficient is also fed to the both filters 73 and 74. Each filter in turn reproduce the original image information.

Figure 12:
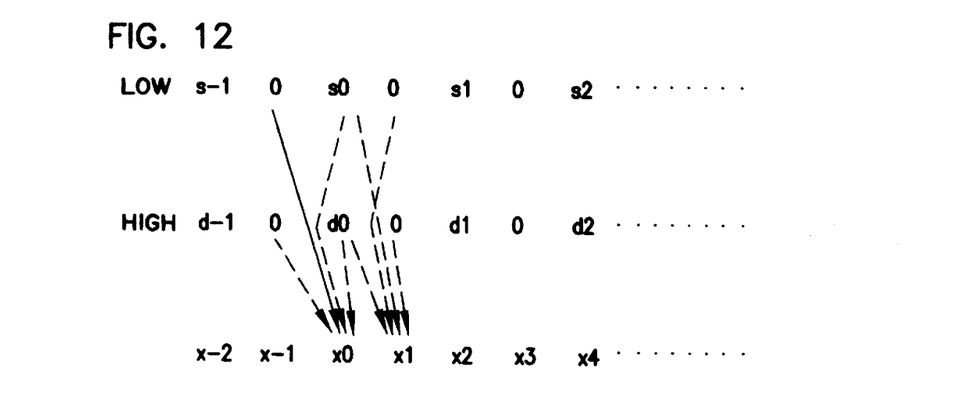
FIG. 12 illustrates a relationship between the compressed data according to the current invention and the reproduced pixel information.

Referring to FIG. 12, the relationship between the coefficients and the reproduced original pixel information is graphically illustrated. A pair of corresponding wavelet coefficients are used to reproduce two adjacent original pixel element information. For example, $s_0$ and $d_0$ generate the original pixel information $x_0$ and $x_1$.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts, as well as implementation in software, hardware, or a combination of both within the principles of the invention to the full extent indicated by the broad general meaning of the terms in which the appended claims are expressed.

What is claimed is:

1. A method of optimizing an image data compression technique, image data representing an image comprising a plurality of layers of pixels, each pixel indicating visual information, comprising the following steps of:
   a) selecting two of said pixels which are adjacently located with each other in one of predetermined directions;
   b) determining a high frequency coefficient and a low frequency coefficient based upon the visual information of said selected two adjacent pixels;
   c) placing said high frequency coefficient at a first location while said low frequency coefficient at a second location with respect to original pixel locations;
   d) repeating said steps a) through c) until all of the predetermined directions are completed; and
   e) converting a plurality of said high frequency coefficients and said low frequency coefficients in a predetermined direction including a direction of the layers according to a predetermined edge conversion technique.

2. The method of optimizing an image data compression technique according to claim 1 wherein said one direction is a horizontal direction.

3. The method of optimizing an image data compression technique according to claim 2 wherein said first location is a right half of said image while said second location is a left half of said image.

4. The method of optimizing an image data compression technique according to claim 3 wherein said predetermined directions include a vertical direction.

5. The method of optimizing an image data compression technique according to claim 4 wherein said first location is a lower left quarter of said image while said second location is a upper left quarter of said image for said left half.

6. The method of optimizing an image data compression technique according to claim 4 wherein said first location is a lower right quarter of said image while said second location is a upper right quarter of said image for said right half.

7. The method of optimizing an image data compression technique according to claim 4 wherein said image is represented by a predetermined number of bit planes, said steps a) through e) are performed for each of said bit planes for image data compression.

8. The method of optimizing an image data compression technique according to claim 7 further comprising the steps of:
   j) decoding said encoded coefficients according to a predetermined decompression technique on each of said bit planes;
   k) converting said decoded coefficients according to a predetermined fill conversion technique to generate said high frequency coefficients and said low frequency coefficients for each of said bit planes; and
   l) based upon said bit planes, restoring said visual information of each pixel from one of said high frequency coefficients and a corresponding one of said low frequency coefficients which representing said selected two adjacent pixels.

9. A system for optimizing an image data compression technique, image data representing an image comprising a plurality of layers of pixels, each pixel indicating visual information, comprising:
   a wavelet converter having a memory for selecting two of said pixels which are adjacently located with each other in one of predetermined directions in said memory and determining a high frequency coefficient and a low frequency coefficient based upon the visual information of each of said selected two adjacent pixels, said high frequency coefficient and said low frequency coefficient being respectively placed at a first location and a second location in said memory with respect to original pixel locations; and
   an edge convertor connected to said wavelet convertor for converting said high frequency coefficients and said low frequency coefficients in a predetermined direction including a direction of the layers according to a predetermined edge conversion technique.

10. The method of optimizing an image data compression technique according to claim 9 wherein said step b) is performed by applying a low pass frequency filter and a high pass frequency filter.

11. The method of optimizing an image data compression technique according to claim 10 wherein said low pass frequency filter is defined by an equation, $s(n)=(x(2n)+x(2n+1))/2$ while said high pass frequency filter is expressed by $d(n)=x(2n)-x(2n+1)$ where n is a non-negative integer, $x(n)$ returns said visual information of one of the pixels specified by said n.

12. The method of optimizing an image data compression technique according to claim 10 wherein said low pass frequency filter is defined by an equation, $s(n)=\max\_int((x(2n)+x(2n+1))/2)$ while said high pass frequency filter is expressed by $d(n)=x(2n)-x(2n+1)$ where n is a non-negative integer, $x(n)$ returns said visual information of one of the pixels specified by said n and $\max\_int(n)$ returns a maximum integer not exceeding n.

13. The method of optimizing an image data compression technique according to claim 12 further comprising the steps of:
   g) decoding said encoded coefficients according to a predetermined decompression technique;
   h) converting said decoded coefficients according to a predetermined fill conversion technique to generate said high frequency coefficients and said low frequency coefficients; and
   i) restoring said visual information of each pixel from one of said high frequency coefficients and a corresponding one of said low frequency coefficients which represent said selected two adjacent pixels.

14. The method of optimizing an image data compression technique according to claim 13 wherein said step i) is accomplished by applying a first filter which is expressed by $x(2n)=s(n)+(d(n)-1))/2$ and a second filter which is expressed by $x(2n+1)=s(n)-\max\_int (d(n)/2)$.

15. The method of optimizing an image data compression technique according to claim 13 wherein said step i) is accomplished by applying a first filter which is expressed by $x(2n)=s(n)+\max\_int((d(n)-1))/2)$ and a second filter which is expressed by $x(2n+1)=s(n)-\max\_int (d(n)/2)$.

16. A system for optimizing an image data compression technique, image data representing an image comprising a plurality of layers of pixels, each pixel indicating visual information, comprising:
   a wavelet converter having a memory for selecting two of said pixels which are adjacently located with each other in one of predetermined directions in said memory and determining a high frequency coefficient and a low frequency coefficient based upon the visual information of each of said selected two adjacent pixels, said high frequency coefficient and said low frequency coefficient being respectively placed at a first location and a second location in said memory with respect to original pixel locations; and an edge convertor connected to said wavelet convertor for converting said high frequency coefficients and said low frequency coefficients in a predetermined direction including a direction of the layers according to a predetermined edge conversion technique.

17. The system for optimizing an image data compression technique according to claim 16 further comprising:

an encoder connected to said edge convertor for encoding said edge converted coefficients according to a predetermined compression technique.

18. The system for optimizing an image data compression technique according to claim 16 wherein said wavelet convertor further comprises a low pass frequency filter and a high pass frequency filter for respectively determining said low frequency coefficient and said high frequency coefficients.

19. The system for optimizing an image data compression technique according to claim 18 wherein said low pass frequency filter is defined by $s(n)=(x(2n)+x(2n+1))/2$ while said high pass frequency filter is defined by $d(n)=x(2n)-x(2n+1)$ where $x(n)$ returns said visual information of one of the pixels specified by said n.

20. The system for optimizing an image data compression technique according to claim 18 wherein said low pass frequency filter is defined by $s(n)=\text{max\_int}((x(2n)+x(2n+1))/2)$ while said high pass frequency filter is defined by $d(n)=x(2n)-x(2n+1)$ where n is a non-negative integer, $x(n)$ returns said visual information of one of the pixels specified by said n and $\text{max\_int}(n)$ returns a maximum integer not exceeding n.

21. The system for optimizing an image data compression technique according to claim 20 further comprising:

a decoder for decoding said encoded coefficients according to a predetermined decompression technique;

a fill converter connected to said decoder for converting said decoded coefficients according to a predetermined fill conversion technique to generate said high frequency coefficients and said low frequency coefficients; and an inverse wavelet convertor connected to said fill convertor for restoring said visual information of each pixel from one of said high frequency coefficients and a corresponding one of said low frequency coefficients which representing said selected two adjacent pixels.

22. The system for optimizing an image data compression technique according to claim 21 wherein said inverse wavelet convertor further comprises a first filter which is defined by $x(2n)=s(n)+(d(n)-1))/2$ and a second filter which is defined by $x(2n+1)=s(n)-\text{max\_int}(d(n)/2)$.

23. The system for optimizing an image data compression technique according to claim 21 wherein said inverse wavelet convertor further comprises a first filter which is defined by $x(2n)=s(n)+\text{max\_int}((d(n)-1))/2)$ and a second filter which is defined by $x(2n+1)=s(n)-\text{max\_int}(d(n)/2)$.

24. The system for optimizing an image data compression technique according to claim 18 further comprising a color bit plane processing unit for processing said image in colors which are represented by a predetermined number of bit planes, said color bit plane processing unit selecting each of said bit planes for said wavelet convertor.

25. The system for optimizing an image data compression technique according to claim 24 further comprising:

a decoder for decoding said encoded coefficients according to a predetermined decompression technique on each of said bit planes;

a fill convertor connected to said decoder for converting said decoded coefficients according to a predetermined fill conversion technique to generate said high frequency coefficients and said low frequency coefficients for each of said bit planes; and an inverse convertor connected to said fill convertor for restoring said visual information of each pixel from one of said high frequency coefficients and a corresponding one of said low frequency coefficients based upon said bit planes which representing said selected two adjacent pixels.

26. The system for optimizing an image data compression technique according to claim 16 wherein said one direction is a horizontal direction in said memory.

27. The system for optimizing an image data compression technique according to claim 26 wherein said first location is a right half of said memory while said second location is a left half of said memory.

28. The system for optimizing an image data compression technique according to claim 27 wherein said predetermined directions include a vertical direction.

29. The system for optimizing an image data compression technique according to claim 28 wherein said first location is a lower left quarter of said memory while said second location is a upper left quarter of said memory for said left half.

30. The system for optimizing an image data compression technique according to claim 28 wherein said first location is a lower right quarter of said memory while said second location is a upper right quarter of said memory for said right half.

* * * * *